United States Patent [19]

Kyle

[11] Patent Number: 4,930,109

[45] Date of Patent: May 29, 1990

[54] METHOD AND APPARATUS OF MEASURING ULTRASONIC TIME TRAVEL INFORMATION OBTAINED FROM LOGGING OPERATIONS IN A WELL BOREHOLE

[75] Inventor: Donald G. Kyle, Plano, Tex.

[73] Assignee: Atlantic Richfield Company, Los Angeles, Calif.

[21] Appl. No.: 291,633

[22] Filed: Dec. 29, 1988

[51] Int. Cl.$^5$ .............................................. G01V 1/40
[52] U.S. Cl. .................................................... 367/27
[58] Field of Search ...................... 367/26, 27, 28, 29, 367/30, 35

[56] References Cited

U.S. PATENT DOCUMENTS

| | | | |
|---|---|---|---|
| 3,978,939 | 9/1976 | Trouiller | 367/155 |
| 4,040,001 | 8/1977 | Vivet et al. | 367/26 |
| 4,042,907 | 8/1977 | Trouiller et al. | 367/26 |
| 4,172,250 | 10/1979 | Guignard | 367/27 |
| 4,346,460 | 8/1982 | Schuster | 367/27 |
| 4,777,629 | 10/1988 | Morris et al. | 367/69 |

Primary Examiner—Ian J. Lobo
Attorney, Agent, or Firm—Geoffrey A. Mantooth

[57] ABSTRACT

A method for measuring time of travel information of an acoustic return obtained from borehole logging operations avoids the phenomena of cycle skipping. The time of travel is determined from a threshold travel time and a digitization travel time. The threshold travel time is measured from the generated acoustic waveform to the detected threshold level of the acoustic return. The digitization travel time is measured from the threshold travel time to the time of the peak amplitude of the acoustic return.

11 Claims, 3 Drawing Sheets

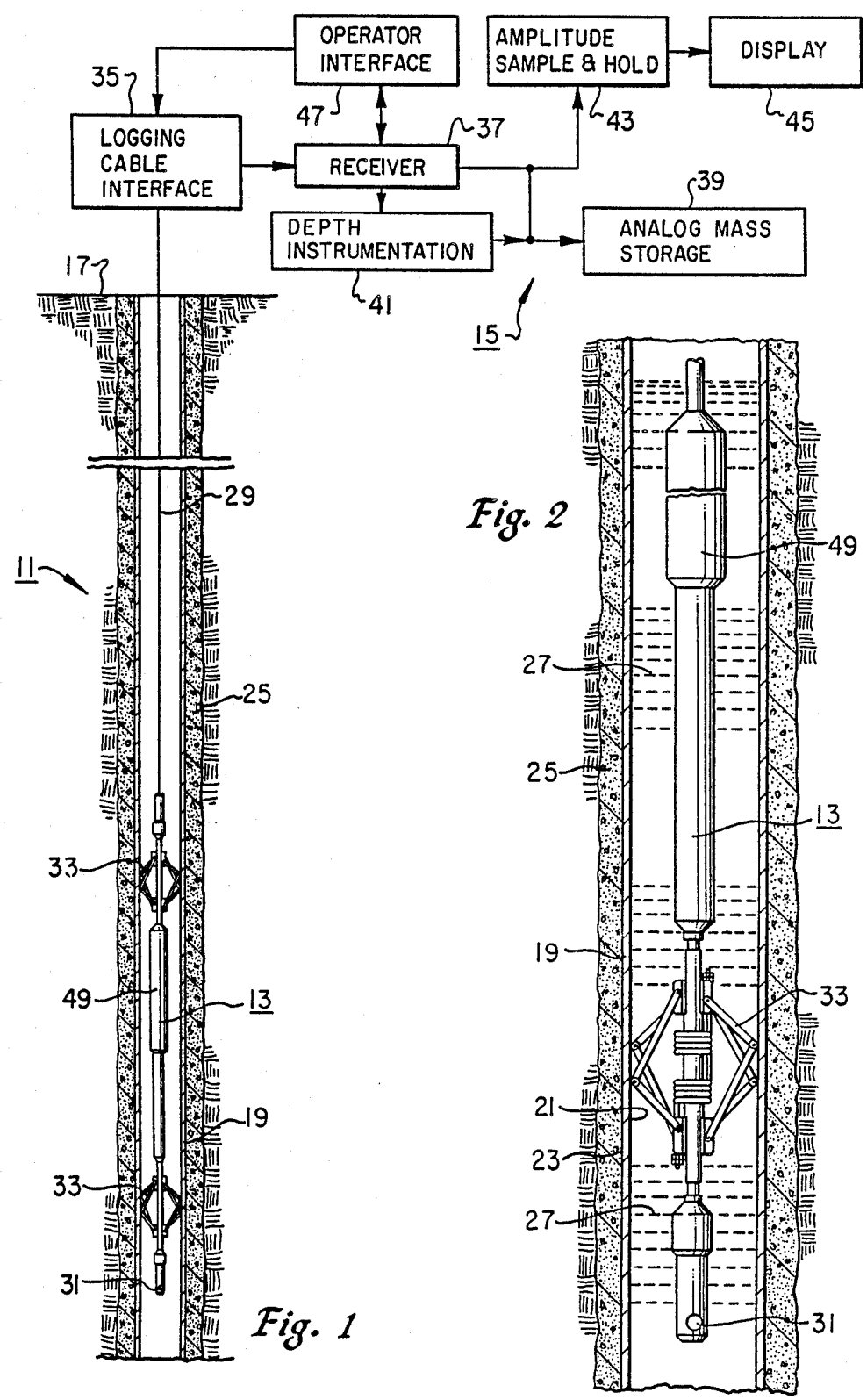

METHOD AND APPARATUS OF MEASURING ULTRASONIC TIME TRAVEL INFORMATION OBTAINED FROM LOGGING OPERATIONS IN A WELL BOREHOLE

FIELD OF THE INVENTION

The present invention relates to methods for measuring acoustical return time travel information obtained from an ultrasonic logging apparatus operating in a well borehole.

BACKGROUND OF THE INVENTION

Zemanek, U.S. Pat. No. 3,369,626 discloses an ultrasonic tool for use in scanning the inner surface of an open well borehole or of casing in a borehole. The tool, which is commercially known as the "borehole televiewer", creates a high resolution picture of the inner surface under investigation. The borehole televiewer is used to "see" the inner surface under investigation through drilling mud or other borehole fluids. In an open borehole, the borehole televiewer provides a picture of the formations surrounding the borehole. In a cased borehole, the borehole televiewer provides a picture of the inner surface of the casing, which can be used to determine the condition of the inner surface.

The borehole televiewer uses a rotating ultrasonic transducer. The transducer serves as a transmitter, to generate acoustic waveforms, and a receiver, to receive the acoustic return. The acoustic return is caused by the reflection of the generated acoustic waveform from the inner surface under investigation. The acoustic return has two measured parameters, the time of travel of the acoustic return and the amplitude, which give an indication of the condition of the investigated surface.

The borehole televiewer measures the time of travel of the acoustic return with threshold detection circuitry located inside of the tool. Simple threshold detection is subject to error caused by cycle skipping. Cycle skipping occurs when the amplitude of the acoustic return varies and causes the threshold detection circuitry to trigger on different cycles within the acoustic return. Such inconsistent triggering, on different cycles, causes variations in the time of travel measurements.

In the prior art there are many techniques which determine the actual time of travel and amplitude of the acoustic returns. Because of the bandwidth limitation of the logging cable however, the borehole televiewer cannot implement any of these techniques; instead only the envelope of the acoustic return is transmitted to the surface.

What is needed is a method of measuring the time of travel of acoustic returns from an ultrasonic tool, which is not subject to cycle skipping.

SUMMARY OF THE INVENTION

It is an object of the present invention to provide a method for measuring the time of travel of acoustic returns from an ultrasonic logging apparatus, which measurement is not affected by cycle skipping.

The method of the present invention provides an ultrasonic transducer means, transmitter means, and receiver means. A generated acoustic waveform is produced with the transmitter means and the transducer means. The resulting acoustic return is detected with the transducer means and the receiver means. The time of occurrence of the generated acoustic waveform is determined and the time of occurrence of the peak amplitude of the acoustic return is determined. The interval of time between the generated acoustic waveform and the peak amplitude is determined.

In one aspect, a threshold amplitude of the acoustic return is determined. A first time interval from the generated acoustic waveform to the threshold amplitude is determined and combined with a second time interval from the threshold amplitude to the peak amplitude, to determine the time of travel of the acoustic return.

BRIEF DESCRIPTION OF THE DRAWINGS

FIG. 1 is a schematic longitudinal cross-sectional view of a cased well borehole, showing an ultrasonic logging apparatus therein, and supporting surface equipment for the ultrasonic logging apparatus, with which the method of the present invention, in accordance with a preferred embodiment, can be practiced.

FIG. 2 is a detail view of the transducer portion of the ultrasonic tool of FIG. 1.

DESCRIPTION OF PREFERRED EMBODIMENT

Figure 3:
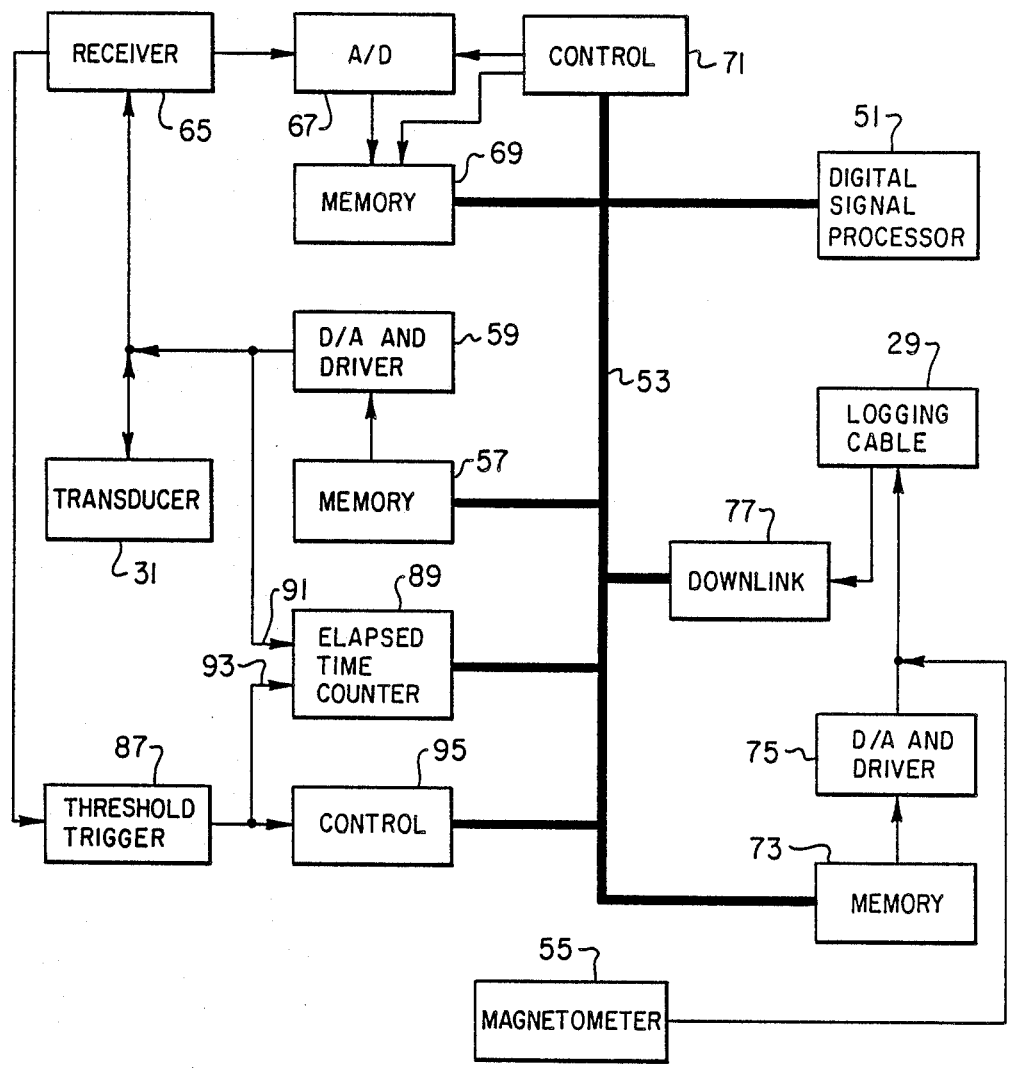
FIG. 3 is a block diagram of the downhole electronics unit which is located within the ultrasonic logging apparatus.

In FIGS. 1 and 2, there is shown a schematic longitudinal cross-sectional view of a cased well borehole 11, showing an ultrasonic logging apparatus 13 located therein, and supporting surface equipment 15, with which the method of the present invention, in accordance with a preferred embodiment, can be practiced.

The well borehole 11, which is drilled into the earth 17, is for producing oil or natural gas. The well borehole 11 is lined with a length of casing 19. The casing wall has inner and outer surfaces 21, 23. Cement 25 fills the annulus between the casing 19 and walls of the borehole 11, for at least some of the length of the casing. The cement 25 is used primarily to isolate one formation from another. The interior of the casing is filled with borehole fluids 27, which may be drilling mud, oil, or both.

The logging apparatus 13 is located within the casing 19 and moves up or down the borehole for logging operations. The logging apparatus 13 is suspended inside of the casing by a logging cable 29, which provides electrical power and communication channels from the surface equipment 15. The logging apparatus 13 includes an ultrasonic transducer 31, which in the preferred embodiment, serves as a transmitter and a receiver. The transducer 31 is oriented so as to generate acoustic waveforms normal to the walls of the casing 19. In the preferred embodiment, the acoustical transducer has a resonant frequency of about 2 MHz and a bandwidth of about 1.0–2.5 MHz. The logging apparatus is kept centered along the longitudinal axis of the casing by centralizers 33.

The logging apparatus 13 transmits data uphole to the surface equipment 15 over the logging cable 29. The surface equipment 15 includes a logging cable interface 35, a receiver 37, an analog mass storage unit 39, depth instrumentation 41, an amplitude sample and hold 43, a display unit 45, and an operator interface 47. The logging cable interface 35 receives signals transmitted over the logging cable 29 from the logging apparatus 13, and transmits signals from the operator interface 47 to the logging apparatus over the logging cable. The receiver 37 amplifies and decodes the signals from the logging apparatus. The receiver 37 sends the appropriate amplified and decoded signals to the analog mass storage unit 39 for storage. The receiver also sends the appropriate signals to the amplitude sample and hold unit 43, which is used to display relevant information on the display unit 45. The operator interface 47 allows the operator to adjust parameters (such as amplifier gain) of the surface receiver 37 and the logging apparatus electronics portion 49. The logging data, comprising time of travel and amplitude information is typically stored in the analog mass storage unit 39 for subsequent processing. However, processing equipment (not shown) can be brought to the borehole site to allow on-site processing of the data.

The electronics portion 49 of the logging apparatus 13, contains the downhole electronics (see FIG. 3). The downhole electronics interfaces with the transducer so as to produce and receive acoustic waveforms, and performs some preliminary processing of the data before being sent uphole. The electronics portion includes a digital signal processor 51, for performing control and processing functions. In the preferred embodiment, the digital signal processor is a TMS320C25 CMOS (complimentary metal oxide semiconductor) integrated circuit, manufactured by Texas Instruments. The digital signal processor is connected to the other units by way of a data bus 53. A magnetometer 55 provides information on the azimuthal orientation of the transducer 31 inside of the borehole 11.

The transducer 31 generates an acoustic waveform which is directed to the casing wall 19. The transducer 31 is excited by transmitter circuitry, which includes the digital signal processor 51, a transmitter memory 57, and a digital-to-analog (D/A) converter and driver 59. The digital signal processor 51 loads the transmitter memory 57 with a programmed waveform by way of the data bus 53. The transmitter memory 57, which is a first-in, first-out (FIFO) memory unit, outputs the programmed waveform to the D/A converter and driver 59. The D/A converter and driver 59 converts the digital waveform into an analog waveform and amplifies the waveform. The amplified waveform is sent to the transducer 31, where an acoustic waveform is generated. The transmitter circuitry excites the transducer on a periodic basis (e.g. 500 times per second).

Figure 4:
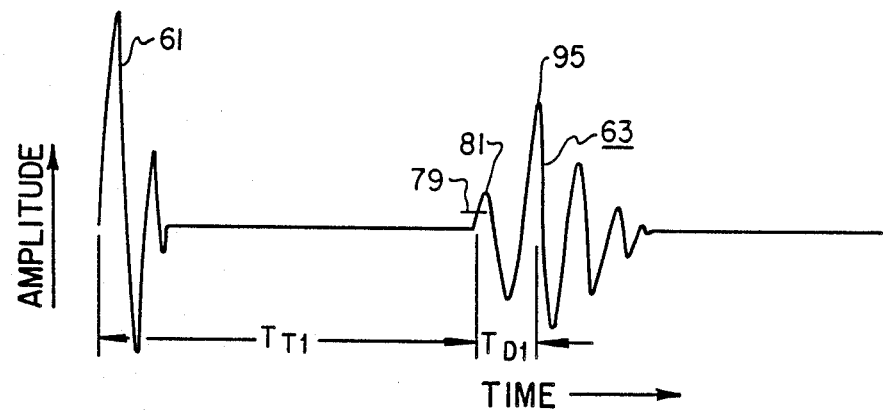
FIGS. 4 and 5 are ultrasonic waveforms which illustrate cycle skipping, showing transmitted waveforms and their respective acoustic returns.

The interaction of the generated acoustic waveform 61 on the casing wall produces an acoustic return 63 (see FIG. 4, where the amplitude of the acoustic return is not shown to scale with respect to the amplitude of the generated acoustic waveform). The acoustic return 63 includes a reflection portion which is caused by the reflection of the generated acoustic waveform 61 off of the inner surface 21 of the casing wall. The acoustic return is received by the transducer 31 and receiver circuitry. The receiver circuitry includes a receiver 65, an analog-to-digital (A/D) converter 67, receiver memory 69, and a control unit 71. The receiver 65 filters and amplifies the acoustic return. The receiver 65 includes circuitry for protecting its amplifier from the transmitted waveform sent to the transducer 31 by the D/A converter and driver 59. The acoustic return is sent from the receiver to the A/D converter 67 where the signal is digitized. The digitized acoustic return is loaded into the receiver memory 69 which is a FIFO memory unit. The control unit 71 controls the initiation and termination of the digitizing process.

Data is transmitted to and received from the surface equipment 15 over the logging cable 29 by way of a downhole logging interface. The logging cable interface includes a memory unit 73 and a D/A converter and driver 75 for transmitting data to the surface equipment, and a downlink unit 77 for receiving data from the surface equipment. The memory unit 73 is a FIFO memory unit.

The acoustic return has a measurable parameter known as time of travel, which together with the peak amplitude of the acoustic return, give an indication of the condition of the investigated surface. Referring to FIG. 4, the time of travel $T_T$ is the time interval between the initiation of the generated acoustic waveform 61 and the detection of the acoustic return 63. The time of travel $T_T$ is used, among other things, to obtain a measurement of twice the distance between the transducer 31 and the investigated surface 21.

Figure 5:
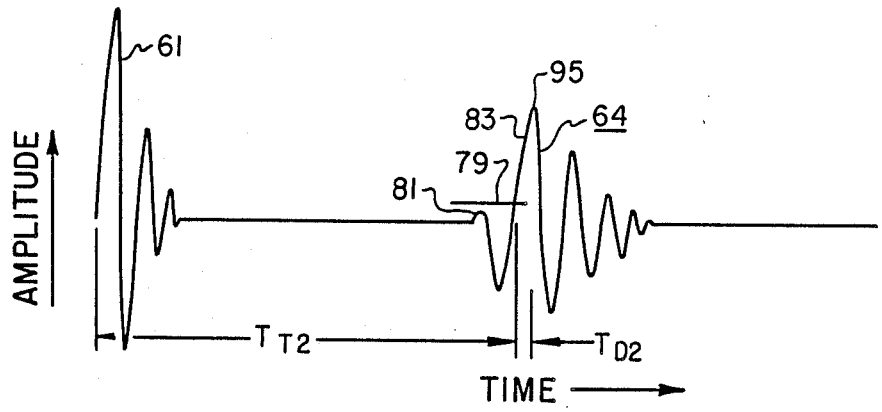

When detecting the acoustic return to measure its time of travel, a simple threshold detection scheme is typically used. Simple threshold detection is however, subject to a phenomenon known as cycle skipping. Referring to FIGS. 4 and 5, cycle skipping occurs where the threshold detection circuitry triggers off of different cycles of the acoustic return 63, 64, because of a variations of amplitude of the acoustic return. In general, any irregularities on the investigated surface will reduce the amplitude of the acoustic return. In FIGS. 4 and 5, the threshold detection level 79 is indicated by a horizontal line segment. In FIG. 4, the threshold detection circuitry triggers off of the first cycle 81. The time of travel for the acoustic return 63 is indicated by $T_{T1}$. In FIG. 5, the threshold detection circuitry triggers off of the second cycle 83 because the amplitude of the first cycle 81 is less than the threshold detection level 79. The threshold detection level is typically set at a value that will minimize triggering of the detection circuitry by noise. The time of travel for the acoustic return 64 in FIG. 5 is indicated by $T_{T2}$. The time interval $T_{T2}$ is one cycle longer than $T_{T1}$, thus indicating a much longer time of travel, even though the acoustic returns 63, 64 have actual times of travel which are substantially similar.

The method of the present invention avoids the problem of cycle skipping by measuring the time of travel of an acoustic return from the initiation of the transmitted acoustic waveform to the peak amplitude of the acoustic return.

The time of travel of an acoustic return is measured with the receiver 65, a threshold trigger 87, and an elapsed time counter 89. The elapsed time counter 89 receives a first input 91 from the output of the D/A converter and driver 59 and a second input 93 from the output of the threshold trigger 87. The threshold trigger 87 has an input connected to the receiver 65. The threshold trigger 87 is a programmable threshold comparator. When the D/A converter and driver 59 sends a pulse to the transducer 31, the first input 91 into the elapsed time counter 89 is triggered, starting the counter. Then, when the receiver 65 receives the acoustic return 63, the acoustic return is sent to the input of the threshold trigger 87, where the acoustic return is compared against the programmed threshold to detect when the acoustic return has occurred. If the threshold trigger 87 detects an input that is equal to or greater than its programmed threshold, then the threshold trigger produces an output signal. The output signal from the threshold signal is sent to the second input 93 of the elapsed time counter 89, which stops the counter. The elapsed time counter 89 has a programmed maximum time delay between the occurrence of the first input and the occurrence of the second input, so that if the acoustic return is scattered by the inner surface, the elapsed time counter will stop counting, and reset itself to be ready for the next acoustic return. The elapsed time between the occurrence of the first input 91 from the D/A converter and driver 59 to the occurrence of the second input 93 from the threshold trigger 87 is the threshold travel time $T_T$.

The threshold trigger 87 activates a control unit 95, which communicates with the receiver control unit 71 over the data bus 53. The control units 71, 95 contain control logic that controls the digitization of the acoustic return by the A/D converter 67. When the threshold trigger 87 produces an output, indicating that an acoustic return has been detected, the control units initiate the digitizing process. Thus, the acoustic return is digitized starting from the threshold level 79.

A digitization travel time $T_D$ is determined and used in the determination of the time of travel of the acoustic return 63. The digitization travel time $T_D$ is the time interval between the threshold level 79 and the peak amplitude 95 of the acoustic return.

The peak amplitude 95 of the acoustic return 63 is determined by the digital signal processor 51, which executes a peak finding or picking program. The program searches the digitized acoustic return time series for its maximum value, by comparing the amplitudes of the time samples with one another. The program can either search for the absolute peak amplitude or for the positive-most peak amplitude. The digitized acoustic return is sent to the digital signal processor 51 from the receiver memory 69 over the data bus 53.

The digitization travel time $T_D$ is determined from the number of time samples of the acoustic return 63 between the threshold level 79 and the peak amplitude 95, and from the time interval between time samples. The time interval between sample times is a function of the digitization rate. The digitization travel time $T_D$ is determined by the digital signal processor 51.

The time of travel of the acoustic return is determined by adding the threshold travel time $T_T$ and the digitization travel time $T_D$ together (in FIG. 4, $T_{T1}$ and $T_{D1}$). By measuring the time of travel of the acoustic return from the initiation of the generated acoustic waveform 61 to the peak amplitude 95, the problem of cycle skipping affecting the measurement is eliminated. The time of travel of the acoustic return 63 of FIG. 4 is substantially similar to the time of travel of the acoustic return 64 of FIG. 5, even though the threshold travel times $T_{T1}$, and $T_{T2}$ differ substantially. The time of travel information is sent uphole to the surface equipment 15 over the logging cable 29 via the memory 73 and D/A converter and driver 75.

The foregoing disclosure and the showings made in the drawings are merely illustrative of the principles of this invention and are not to be interpreted in a limiting sense.

I claim:

1. A method of measuring time of travel information of an acoustic return obtained from an ultrasonic logging apparatus operating in a well borehole, said ultrasonic logging apparatus generating an acoustic waveform and receiving the acoustic return from said generated acoustic waveform, said acoustic return having a peak amplitude, said time of travel of said acoustic return being measured from said generated acoustic waveform, comprising the steps of:
   (a) providing ultrasonic receiver means and providing threshold detection means for determining a threshold level of said acoustic return;
   (b) receiving said acoustic return with said receiver means and detecting a threshold amplitude of said acoustic return with said threshold detection means;
   (c) measuring a first time interval from said generated acoustic waveform to said detected threshold amplitude;
   (d) detecting said peak amplitude of said return, measuring a second time interval from said detected threshold amplitude to said peak amplitude;
   (e) combining said first and second time intervals to obtain the time of travel of said acoustic return.

2. The method of claim 1 wherein said first time interval is measured from the initiation of said generated acoustic waveform.

3. The method of claim 2 wherein said second time interval is measured by digitizing said acoustic return from said threshold amplitude to said peak amplitude and determining the number of time samples in said second time interval.

4. The method of claim 1 wherein said second time interval is measured by digitizing said acoustic return from said threshold amplitude to said peak amplitude and determining the number of time samples in said second time interval.

5. A method of measuring an acoustic return obtained from an acoustical logging apparatus operating in a well borehole, said acoustic return resulting from a generated acoustic waveform produced by said acoustical logging apparatus, said acoustic return having a peak amplitude, comprising the steps of:
   (a) providing acoustical receiver means, threshold detection means for determining a threshold level of said acoustic return, peak detector means for detecting said acoustic return peak amplitude, and digitizer means for digitizing said acoustic return;
   (b) receiving said acoustic return with said receiver means and detecting said threshold level of said acoustic return with said threshold detection means;
   (c) measuring a first time interval from said generated acoustic waveform to said detected threshold amplitude;
   (d) initiating the digitization of said acoustic return with said digitizer means upon the detection of said threshold level of said acoustic return;
   (e) detecting said acoustic return peak amplitude with said peak detector means;
   (f) measuring a second time interval from said detected threshold amplitude to said peak amplitude;
   (g) combining said first and second time intervals to obtain the time of travel of said acoustic return.

6. A method of measuring an acoustic return obtained from an acoustical logging apparatus operating in a well borehole, said acoustic return resulting from a generated acoustic waveform produced by said acoustical logging apparatus, said acoustic return having a peak amplitude, comprising the steps of:
   (a) providing acoustical receiver means, threshold detection means for determining a threshold level of said acoustic return, digitizer means for digitizing said acoustic return, and memory means for storing said digitized acoustic return;

(b) receiving said acoustic return with said receiver means and detecting said threshold level of said acoustic return with said threshold detection means;

(c) measuring a first time interval from said generated acoustic waveform to said detected threshold amplitude;

(d) initiating the digitization of said acoustic return with said digitizing means upon the detection of said threshold level of said acoustic return and digitizing said acoustic return with said digitizer means;

(e) storing said digitized acoustic return in said memory means;

(f) determining said acoustic return peak amplitude from said digitized acoustic return;

(g) measuring a second time interval from said detected threshold amplitude to said peak amplitude;

(h) combining said first and second time intervals to obtain the time of travel of said acoustic return.

7. An apparatus for measuring an acoustic return obtained from an acoustical logging apparatus operating in a well borehole, said acoustic return resulting from a generated acoustic waveform, said acoustic return having a peak amplitude, comprising:

(a) receiver means for receiving said acoustic return, transmitter means for generating said generated acoustic waveform;

(b) threshold detection means for detecting a threshold level of said acoustic return, said threshold detection means being connected with said receiver means;

(c) first timer means being connected with said threshold detection means and with said transmitter means, said first timer means measuring a first time interval from said generated acoustic waveform to said detected threshold level;

(d) digitizer means for digitizing said acoustic return, said digitizer means being connected with said receiver means;

(e) control means for controlling the operation of said digitizer means, said control means being connected with said digitizer means and with said threshold detection means, said control means causing said digitizer means to begin digitizing when said threshold detection means detects said threshold amplitude;

(f) peak detector means for detecting said peak amplitude of said acoustic return, said peak detector means being connected with said digitizer means;

(g) second timer means being connected with said digitizer means, said second timer means measuring a second time interval from said detected threshold level to said peak amplitude, wherein said first and second time intervals can be combined to obtain the time of travel of said acoustic return.

8. The apparatus of claim 7 wherein said second timer means and said peak detector means comprise processor means, said digitized acoustic return being stored in memory means, said processor means detecting said peak amplitude of said digitized acoustic return in measuring the second time interval.

9. The apparatus of claim 8, wherein said processor means is connected with said first timer means and combines the first and second time intervals to obtain the time of travel of said acoustic return.

10. The apparatus of claim 9, wherein said first timer means comprises an elapsed time counter.

11. The apparatus of claim 7, wherein said first timer means comprises an elapsed time counter.

* * * * *